United States Patent
Dalzell, Jr.

[15] 3,656,056
[45] Apr. 11, 1972

[54] BULLET HOLE LOCATOR-RESISTANCE TYPE

[72] Inventor: Eugene W. Dalzell, Jr., Pittsfield, Mass.
[73] Assignee: The United States of America as represented by the Secretary of the Army
[22] Filed: Apr. 7, 1969
[21] Appl. No.: 814,130

[52] U.S. Cl..................324/65 R, 73/167, 273/102.2 R, 324/71 E
[51] Int. Cl..................G01r 27/02, G01l 5/14
[58] Field of Search..........324/65, 71 E, 71 C; 73/167; 273/102.2; 235/151.3; 340/16

[56] References Cited

UNITED STATES PATENTS

| | | | |
|---|---|---|---|
| 3,236,096 | 2/1966 | Macatician et al. | 324/71 E |
| 2,925,582 | 2/1960 | Mattei et al. | 340/16 |
| 3,445,808 | 5/1969 | Johnson | 340/16 |
| 3,489,413 | 1/1970 | Groder et al. | 340/16 X |

FOREIGN PATENTS OR APPLICATIONS

| | | | |
|---|---|---|---|
| 496,874 | 4/1930 | Germany | 273/102.2 |
| 707,283 | 5/1941 | Germany | 273/102.2 |

Primary Examiner—Rudolph V. Rolinec
Assistant Examiner—Ernest F. Karlsen
Attorney—Harry M. Saragovitz, Edward J. Kelly, Herbert Berl and Robert P. Gibson

[57] ABSTRACT

The point at which a bullet or other passing object passed a line may be determined by the present invention. Or, the direction from which the object came, is ascertained by comparing the points at which the object passed spaced-apart lines or planes. Electrical resistance type elements, connected to an indicator or computor, indicate the points at which the object passed two or more lines or planes. As exemplary, one can determine the direction a bullet came from which struck a helicopter.

1 Claims, 4 Drawing Figures

PATENTED APR 11 1972 3,656,056
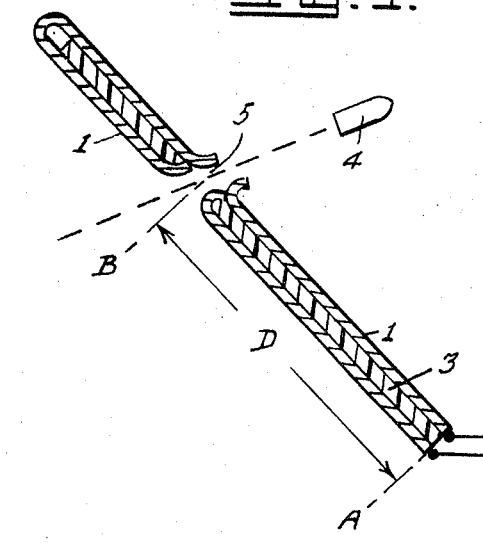
Fig. 1.
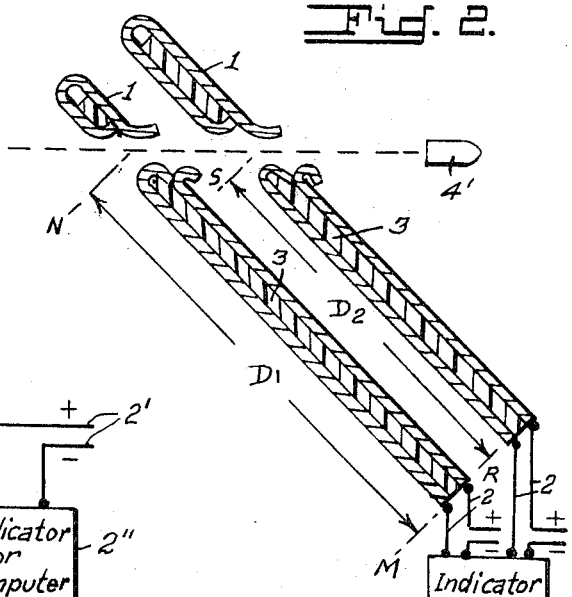
Fig. 2.
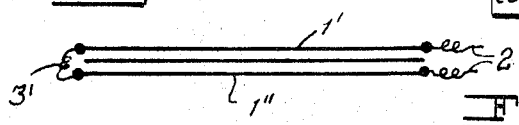
Fig. 4.
Fig. 3.
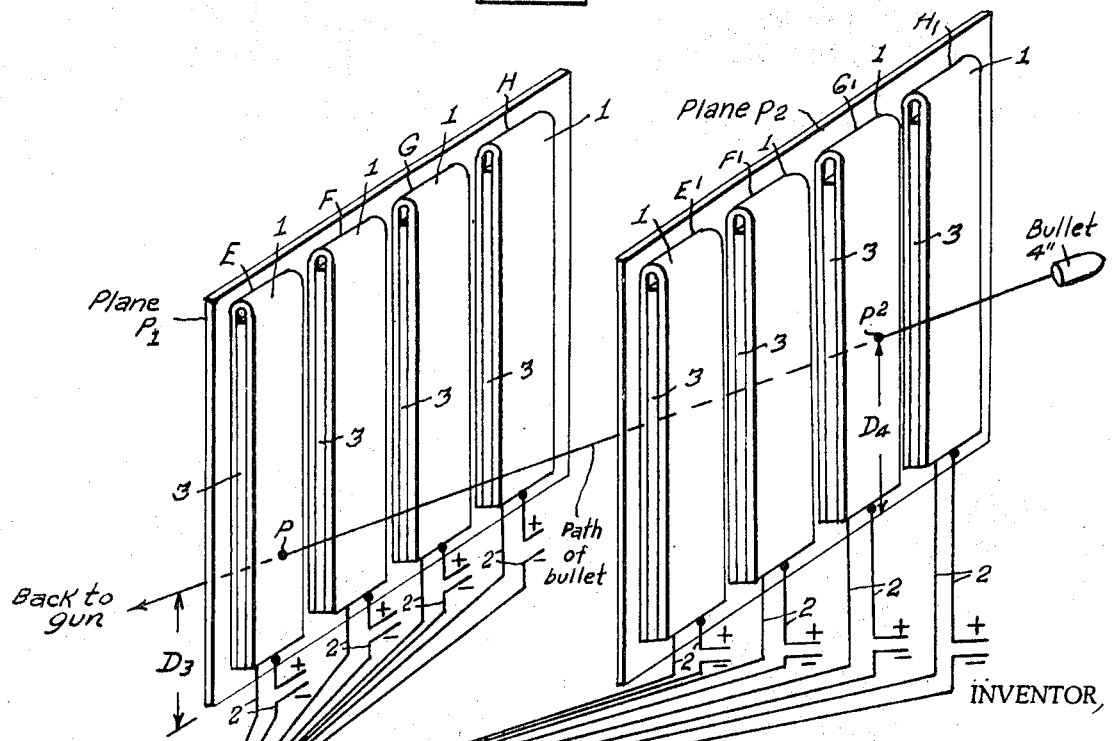
INVENTOR,
Eugene W. Dalzell, Jr.
BY: Harry M. Saragovitz,
Edward J. Kelly, Herbert Berl &
R. P. Gibson          ATTORNEYS.

BULLET HOLE LOCATOR-RESISTANCE TYPE

BRIEF SUMMARY

In U.S. Pat. No. 3,445,808, May 20, 1968 F. P. Johnson discloses apparatus for determining the direction of a bullet as it passes through two spaced-apart sheets of material. A system of microphones (eight, for example) and a computer are used.

In the present invention an arrangement of spaced sheets of wire mesh, wires, strips, sheets or plates serves the sensing function as will be explained in further detail hereinafter. I In the drawing:

FIG. 1 is a schematic view of a sensor in its most simple form and an indicator.

FIG. 2 is a schematic view of two of the simple sensors and one of the possible arrangements therefor for determination of direction of a passing object in two dimensions.

FIG. 3 is a schematic view of a series of sensors arranged for determination of direction of a passing object in three dimensions.

FIG. 4 shows a modification of the semi-conductor connections.

In FIG. 1 a current from conductors 2 is impressed across sensing conductor 1, and indicator or computer 2''. The sensing conductors may be formed from wires, sheets of wire mesh, strips, solid sheets or plates, or other simply by folding it back upon itself and attaching it to a source of electrical potential 2' and indicator 2'' by leads or electrical connecting means 2. An insulator 3 may be used if desired to prevent accidental short-circuiting across the sensing conductor from one point to another along the area where one portion lies adjacent to another. As illustrated in FIGS. 1 and 2, the semiconductor or resistance element unit 1 may include a loop at the upper end of the parallel sections to electrically interconnect the sections. In that embodiment the loop serves as electrical conducting means between the parallel sections. Or, as illustrated in FIG. 4, the sensing conductor unit may comprise substantially parallel members 1' and 1'' electrically interconnected by conductor 3'.

Each of the sensing conductors 1 is a resistive conductor, that is, a conductor having a measurable resistance to the passage of electric current. When the conductor is short-circuited at any point between its ends, the length of the electrical circuit through the conductor is shortened and the resistance to the passage of the current through the shortened circuit is measurably changed. Because the percentage change in resistance is proportional to the length of the sensing conductor circuit, an accurate determination of the location of the point in the length of the conductor where the short-circuit occurred can be made, as for example by the application of the principles of Ohm's Law. Any otherwise suitable material which has a measurable resistance to the passage of electric current may be used to form a sensing conductor in carrying out this invention.

An object 4 strikes the sensing conductor 1 (and insulator 3) and smashes sensing conductor portions together with a short-circuit, as illustrated at point 5. Now, the electrical path through the sensing conductor is shortened and current flows more freely through the short-circuit, rather than flowing through the entire length of sensing conductor 1. Therefore, the electrical potential drop across leads 2 is changed, as will be readily apparent to those skilled in the art. This change is proportioned to the distance D between the base reference point A and the point of short-circuiting B (or point 5). Therefore, a simple indicator or computer may be used to indicate the point at which passing object 4 smashed sensing conductor 1. A momentary short circuit caused by touching of the ruptured portions of the sensing conductor parts is sufficient to register the location of the rupture on the computer, even should the ruptured portions become separated after such initial contact.

In FIG. 2 a slightly more sophisticated arrangement permits determination of the direction, in one plane, from which the passing object came. A pair of sensing conductors 1 are arranged generally parallel to each other and in the plane of the passing object 4'. The object smashes or ruptures one sensor (and short-circuits it) at point N, a distance $D_1$ from reference point M. The object short-circuits the other sensor at point 5, a distance $D_2$ from reference point R. The distance between the sensors is known, and the values of $D_1$ and $D_2$ are simply computed by the change of the electrical potential drop across the electrodes, as explained in regard to FIG. 1. Therefore, the direction of object 4' can be determined.

Although sensors 1 may be of a wire form they may also take a band or strip form. A passing object slightly out of the desired plane may fail to strike a thin wire whereas it would be more likely to strike a band or strip of material wider than a wire. The sensor units each has closely spaced runs or linear portions separated by a thin layer of insulation, but suitably electrically interconnected, such as by being formed from a single conducting strip folded back upon itself, as shown in FIGS. 1, 2 and 3, or by being made up of separate strips joined by an electrical connection 3', as shown in FIG. 4. In either case the electric current passes through the entire length of the sensing unit and back to its source unless a short-circuit is caused by a rupture such as illustrated in FIG. 1 in which event the current passes through a shortened path brought about by the short-circuit.

In FIG. 3 the invention takes an even more sophisticated form wherein the path of an object, in three dimensions, may be determined.

A series of sensors 1, designated E, F, G and H, is located in a sheet-like panel or plane $P_1$. Another series of sensors 1, designated E', F', G' and H', is located in a sheet-like panel or plane $P_2$. An object 4'' passes through both panels or planes. As exemplary, it short-circuits sensor E at Point P, a distance $D^3$ from leads 2. It short circuits sensor G' at point $P^2$, a distance $D^4$ from leads 2. A computer connected to leads 2 senses that the point P is at a point somewhere along E sensor, (a known distance from the left side of plane $P_1$), and at distance $D_3$ from the bottom of plane $P_1$, a distance which can be determined as set out hereinabove. Likewise the point $P^2$ in plane $P_2$ is at a point somewhere along sensor $G^1$, (a known distance from the left side of plane $P_2$), and at distance $D_4$ from the bottom, a distance which can be readily determined.

With the coordinates of points P and $P^2$ ascertained the direction of the passing, object, in three dimensions, may be calculated.

Other modifications will suggest themselves to those skilled in the art.

I claim:

1. Apparatus for determining the path of a passing object such as a projectile, comprising a first panel provided with a plurality of closely spaced parallel elongated sensing units, a second panel spaced a substantial distance from the first panel in generally parallel relation thereto, said second panel also being provided with a plurality of closely spaced parallel elongated sensing units, each sensing unit of each panel comprising a resistive conductor arranged in closely spaced runs separated by a thin layer of insulation and electrically connected at one end, the other ends of the conductor runs being connected in an electric circuit which includes a source of electric current, the entire length of the conductor runs normally forming a part of the circuit and imposing a known resistance to the passage of electric current through such circuit, an indicating computer operatively connected to the individual electric circuits of each sensing unit of both panels so as to measure the resistance imposed on each circuit by each conductor, the runs of each conductor being so closely spaced that when ruptured by the penetration of a projectile passing through the panels, the ruptured portions of the conductor runs will bridge the normally insulated space between the runs and thereby produce a short-circuit at the point of the projectile penetration to decrease the effective length of the resistive conductor forming a part of its electrical circuit and thereby change the amount of resistance imposed on the circuit by such ruptured conductor and which is being measured by the computer, such change in resistance being proportional to the change in effective length of the ruptured conductor so that the point of penetration of a particular conductor in each of the spaced panels may be located by the computer to determine the path of a projectile penetrating the two spaced panels.

* * * * *